(12) United States Patent
Foerster et al.

(10) Patent No.: US 11,274,992 B2
(45) Date of Patent: Mar. 15, 2022

(54) METHOD FOR ANALYZING THE COMPRESSED-AIR SUPPLY SECURITY OF A COMPRESSED-AIR SYSTEM

(71) Applicant: KAESER KOMPRESSOREN SE, Coburg (DE)

(72) Inventors: Andreas Foerster, Coburg (DE); Florian Wagner, Coburg (DE)

(73) Assignee: Kaeser Kompressoren SE, Coburg (DE)

( * ) Notice: Subject to any disclaimer, the term of this patent is extended or adjusted under 35 U.S.C. 154(b) by 633 days.

(21) Appl. No.: 16/094,348

(22) PCT Filed: Apr. 18, 2017

(86) PCT No.: PCT/EP2017/059138
§ 371 (c)(1),
(2) Date: Oct. 17, 2018

(87) PCT Pub. No.: WO2017/182447
PCT Pub. Date: Oct. 26, 2017

(65) Prior Publication Data
US 2019/0120718 A1     Apr. 25, 2019

(30) Foreign Application Priority Data
Apr. 21, 2016  (EP) .................................... 16166507

(51) Int. Cl.
*G01M 13/00* (2019.01)
*G05B 23/02* (2006.01)
*G05D 16/20* (2006.01)

(52) U.S. Cl.
CPC ......... *G01M 13/00* (2013.01); *G05B 23/0235* (2013.01); *G05B 23/0283* (2013.01); *G05D 16/20* (2013.01)

(58) Field of Classification Search
CPC ............... G01M 13/00; G05B 23/0235; G05B 23/0283; G05D 16/20
See application file for complete search history.

(56) References Cited

U.S. PATENT DOCUMENTS

| 4,502,842 A | 3/1985 | Currier et al. |
| 5,297,381 A | 3/1994 | Eich et al. |

(Continued)

FOREIGN PATENT DOCUMENTS

| CN | 1826255 A | 8/2006 |
| CN | 101443558 A | 5/2009 |

(Continued)

OTHER PUBLICATIONS

Kopanos, Georgios M, et al., "Optimization of Network of Compressors in Parallel: Operational and Maintenance Planning—The AirSeparation Plant Case", Applied Energy, 146, 2015, pp. 453-470.*

(Continued)

*Primary Examiner* — Manuel L Barbee
(74) *Attorney, Agent, or Firm* — Myers Bigel, P.A.

(57) ABSTRACT

The invention relates to a method for the analysis of the compressed-air supply security of a compressed-air system which comprises one or more compressed-air generators ($C_1$, $C_2$) and supplies one or more compressed-air consumers via a compressed-air network (9),
characterized in that a time course of the maximum delivery volumetric flow rate MDVF(t) is recorded, estimated or calculated, that a time course of the consumption volumetric flow rate CVF(t) is recorded, estimated or calculated, and that for the analysis of the compressed-air supply security the time course of the maximum delivery volumetric flow rate MDVF(t) and the time course of the consumption (Continued)

volumetric flow rate CVF(t) are automatically offset against each other over an analysis period.

26 Claims, 12 Drawing Sheets

(56) References Cited

U.S. PATENT DOCUMENTS

| | | | |
|---|---|---|---|
| 7,785,479 | B1 | 8/2010 | Hosford |
| 2002/0170606 | A1 | 11/2002 | Wichert |
| 2003/0065423 | A1 | 4/2003 | Vanderbeek |
| 2003/0086789 | A1 | 5/2003 | Raghavachari |
| 2012/0029706 | A1 | 2/2012 | Wagner et al. |
| 2013/0323088 | A1 | 12/2013 | Medow et al. |

FOREIGN PATENT DOCUMENTS

| | | |
|---|---|---|
| CN | 102691696 A | 9/2012 |
| CN | 104976146 A | 10/2015 |
| DE | 10355250 A1 | 6/2005 |
| DE | 102008064491 | 6/2010 |
| DE | 102011012558 | 7/2012 |
| EP | 1995140 | 11/2008 |
| EP | 2746212 A3 | 7/2014 |
| JP | 3754583 B2 | 12/2005 |

OTHER PUBLICATIONS

International Search Report and Written Opinion for PCT/EP2017/059138 dated Jun. 26, 2017, 10 pages, no translation.
Notice of Opposition to a European Patent filed in corresponding EP Patent Application No. 16166507.0 mailed Jul. 22, 2019, 35 pages.
Atlas Copco Compressed Air Manual, 8th edition, 2015, 146 pages.
Kopanos, Georgios M, et al., "Optimization of a network of compressors in parallel: Operational and maintenance planning—The air separation plant case", Applied Energy, 146, 2015, pp. 453-470.
English translation of Search Report for CN Patent Application No. 2017800318660, dated Dec. 4, 2020, 3 pages.
Examination Report for Indian Patent Application No. 201827038345 dated Feb. 26, 2021, 5 pages.

* cited by examiner

Fig. 11 (State of the art)

METHOD FOR ANALYZING THE COMPRESSED-AIR SUPPLY SECURITY OF A COMPRESSED-AIR SYSTEM

RELATED APPLICATIONS

The present application is a 35 U.S.C. § 371 national phase application of PCT International Application No. PCT/EP2017/059138, filed Apr. 18, 2017, which claims priority from European Patent Application No. 16166507.0, filed Apr. 21, 2016, the disclosures of which are hereby incorporated herein by reference in their entireties.

FIELD OF THE INVENTION

The invention relates to a method for analyzing the compressed-air supply security of a compressed-air system which comprises one or more compressed-air generators and supplies one or more compressed-air consumers via a compressed-air network, wherein a time course of the maximum delivery volumetric flow rate is recorded, estimated or calculated, wherein a time course of the consumption volumetric flow rate is recorded, estimated or calculated, and wherein the time course of the maximum delivery volumetric flow rate and the time course of the consumption volumetric flow rate over several time points are automatically offset against each other for the analysis of the compressed-air supply security, in accordance with the characteristics of claim 1. Furthermore, a method for controlling a compressed-air system with the characteristics of claim 20 is specified.

BACKGROUND OF THE INVENTION

Industrial compressed-air systems are operated to provide compressed air for the operation of processes and machines. In this case, the compressed-air system typically comprises one or more compressed-air generators. One or more compressed-air consumers are connected to the compressed-air system via a compressed-air network and are supplied with compressed air. A compressed-air system typically also includes components for compressed-air treatment (e.g. filters, condensate separators, dryers, etc.), compressed-air reservoirs and other components such as pipelines, valves, etc. The actual design of a compressed-air system depends on the intended application. The type of components used, such as compressors, compressed-air treatment components (filters, condensate separators, dryers, etc.), compressed-air reservoirs and the structure of the network (the piping) can vary greatly. There are no standardized configurations and structures in this respect. However, it can be noted that, as a rule, several compressed-air generators are provided in parallel connection or optionally also in series connection, wherein a certain redundancy is provided with regard to the generation of compressed air.

Typically, the compressed-air system works together with a higher-level control system (system control). This can be provided directly at or in the compressed-air system or specifically assigned to the compressed-air system. However, a higher-level control system, which controls not only the compressed-air system but also other technical systems and components, can also be provided. The task of the system control is to control the entire compressed-air system, in particular by means of load or non-load commands and, if necessary, a speed specification for the individual compressed-air generators, so that the limits specified by the operator of the compressed-air system, namely a specified required pressure as the lower limit on the one hand and a pressure margin limit as the upper limit on the other hand, are maintained.

Adherence to the above specified pressure limits implicitly means that on average with respect to time the compressed-air generators generate the amount of compressed air required by the compressed-air consumers. Differences between the volume flow supplied and the volume flow consumed by the compressed-air consumers at a given point in time result in changes in the network pressure. Changes in the network pressure principally do not pose a problem either for the compressed-air system or for the compressed-air consumers, provided the specified pressure limits are observed. The fact that the network pressure does not have to be kept constant is used by the system control as a degree of freedom, in particular with regard to energy, maintenance, wear, etc., to carry out optimizations.

The fact that changes in the network pressure do not immediately lead to a violation of the specified pressure limits is due to the storage tanks and line volumes (i.e. the volumes of the lines) present in the compressed-air system and in the compressed-air network, which define the so-called effective buffer volume V overall. The effective buffer volume V determines to what extent differences between delivery volumetric flow rate DVF(t) and consumption volumetric flow rate CVF(t) manifest themselves in pressure changes, i.e. in changes in the network pressure. The following applies: The larger the effective buffer volume V, the lower the rate of change of the network pressure (under the same conditions otherwise). At the same time, the effective buffer volume V, comparable to a rechargeable battery, can be seen as a consumer and supplier of compressed air. Too much compressed air generated is stored in the effective buffer volume and can be used at a later date to supplement a low delivery volumetric flow rate DVF(t) of the compressed-air generator with compressed air from the effective buffer volume V in relation to the current consumption volumetric flow rate CVF(t).

The consumption volumetric flow rate CVF(t) serves as a parameter for the compressed-air requirement of the compressed-air consumers. The total requirement of all compressed-air consumers results in the respective consumption volumetric flow rate CVF(t) by the superposition (addition) of the respective individual requirements. The actual operation of the connected consumers is usually not synchronized in time, resulting in a varying total compressed-air requirement. If many small, unsynchronized compressed-air consumers are operated in a compressed-air network, an average consumption can be assumed. Few large, unsynchronized compressed-air consumers tend to lead to large fluctuations in the consumption volumetric flow rate CVF(t).

Depending on the type of process to be supplied or the machines to be supplied as compressed-air consumers, different requirements must be met by the compressed-air system. Typical requirements are, for example, compressed-air quality (particle content, chemical purity, etc.), compliance with a minimum pressure or coverage of a consumption volumetric flow rate CVF(t). The consumption volumetric flow rate CVF(t) is determined by the sum of all compressed-air requirements of all compressed-air consumers potentially in operation simultaneously. As a rule, all requirements must be met simultaneously and permanently during operation of the compressed-air system.

Compressed-air systems are usually designed with a redundancy with regard to the delivery volumetric flow rate (supply reserve) in order to still be able to cover the compressed-air demand with a high probability in case of unavailability of compressed-air generators (e.g. due to maintenance measures). As long as the consumption volumetric flow rate CVF(t) behaves as assumed when planning the compressed-air system, the required quantity of compressed air can be produced even if compressed-air generators are not available. As a rule, however, the consumption volumetric flow rate CVF(t) changes over the months or years of operation of a compressed-air system due to changes in the process supplied with compressed-air, e.g. by expanding the machinery supplied with compressed air in a production plant. This reduces or eliminates the redundancy of the delivery volumetric flow rate DVF (supply reserve) over time. This often remains undetected for a long time, as the consumption volumetric flow rate CVF(t) can always be covered when the compressed-air generator is in trouble-free operation. Only when a compressed-air generator is not available at an unfavorable time (e.g. failure of a comparatively large compressed-air generator with a fully utilized machine park) does it become apparent that a supply reserve is no longer available and the required quantity of compressed air can no longer be produced. In this case, the pressure falls below the required value (i.e. below the required pressure) and consequently causes problems in the process supplied with compressed air.

The current state of the art is that oversizing in the planning of a compressed-air system is achieved by defining a minimum delivery volumetric flow rate in a first step, which the compressed-air system must still be able to generate even if one or more compressed-air generators are not available, based on the assumed worst-case scenario. Depending on the relevance of the compressed air for the process supplied with compressed air, the failures of none, one or even several compressed-air generators are taken into account. The selection and configuration of the compressed-air generator in the compressed-air system must then be carried out during planning in such a way that the maximum delivery volumetric flow rate MDVF(t) is still above the minimum delivery volumetric flow rate in the defined worst case. In order to enable covering future increases in the consumption volumetric flow rate CVF(t), the minimum delivery volumetric flow rate does not take into account the maximum consumption volumetric flow rate expected immediately after commissioning of a compressed-air system, but a slightly higher value. It is often assumed that a new compressed-air system will be oversized by 10 to 20%. A common practice for a defined worst case scenario is that the compressed-air generator with the largest delivery volumetric flow rate is not available with fully utilized machine park or full compressed-air extraction.

As already mentioned, however, a safety reserve can be gradually depleted or, over time, there may be a risk of pressure underruns that initially remain undetected.

SUMMARY OF THE INVENTION

It is the object of the present invention to specify a method that ensures the compressed-air supply security of a compressed-air system even better.

A key consideration of the method according to the invention is to determine, by offsetting a time course of the consumption volumetric flow rate CVF(t) with a time course of a maximum delivery volumetric flow rate MDVF(t), whether the compressed-air supply security of a compressed-air system is given at all times with sufficient certainty, i.e. whether the course of the consumption volumetric flow rate can be covered within an analyzed time range. The determination of the consumption volumetric flow rate CVF(t) and/or the determination of the maximum delivery volumetric flow rate MDVF(t) can occur in an automated manner. The offsetting for the analysis of compressed-air supply security is automated in all embodiments according to the invention. Automated means that this step takes place without human intervention.

In other words: Compressed-air supply security means the property of a compressed-air system that the compressed-air consumers can always receive the required consumption volumetric flow rate within a period of time under consideration. In an even narrower definition of the term "compressed-air supply security", the specified required pressure must not be underrun.

The method according to the invention for analyzing the compressed-air supply security of a compressed-air system, which comprises one or more compressed-air generators and supplies compressed-air via a compressed-air network or several compressed-air consumers, provides that a time course of the maximum delivery volumetric flow rate MDVF(t) is recorded, estimated or calculated, that a time course of the consumption volumetric flow rate CVF(t) is detected, estimated or calculated, and that the time course of the maximum delivery volumetric flow rate MDVF(t) and the time course of the consumption volumetric flow rate CVF(t) are automatically offset against each other over an analysis period for the analysis of compressed-air supply security.

The analysis period can be specified manually or in some other way. However, an analysis period can also be defined automatically, for example by other program routines. It is also conceivable that an analysis period could be shifted cyclically or continuously as a wandering time window. However, the analysis period can also cover the entire runtime of a compressed-air system, for example. Overall, upper and lower limits of an analysis period can be defined as required. Finally, it is also conceivable that not only a single analysis period, but several analysis periods are included in the analysis.

The method according to the invention can be cyclical, event-driven and/or one-off. In the abstract, the method can also be represented as follows, wherein steps 2, 3 and 4 are optional.

Step 1: Analysis of the time courses of the maximum delivery volumetric flow rate in the DVF(t) and the consumption volumetric flow rate CVF(t) by offsetting both flows against each other Step 2: Evaluation of the analysis result Step 3: Identification of suitable improvement measures Step 4: Implementation step The analysis period can be completely or partially in the past (retrospective analysis), but the analyzed period can also be completely or partially in the future (prospective analysis). In a retrospective analysis, frequent direct or indirect measured values for the course of the consumption volumetric flow rate CVF(t) are available. Direct measured values directly represent the course of the consumption volumetric flow rate CVF(t). Indirect measured values, such as the network pressure p(t) and the actual delivery volumetric flow rate DVF(t), make it possible to derive the course of the consumption volumetric flow rate CVF(t), which is not measured directly, particularly via calculation models.

The time course of the maximum delivery volumetric flow rate MDVF(t) is not based on directly or indirectly recorded measured values, but is a theoretical curve based on an assumption as to which compressed-air generators (already available in real terms or in future variants or within the planning of a compressed-air system in the analysis period, based on a possible scenario, possibly assumed or actually arrived) are available at a certain time. Compressed-air generators that are not available at a time and/or in a period do not contribute to the maximum delivery volumetric flow rate MDVF(t) at this time and/or in this period, i.e. they are not taken into account when determining the maximum delivery volumetric flow rate MDVF(t).

In a prospective analysis, no concrete measured values for the maximum delivery volumetric flow rate MDVF(t) and the course of the consumption volumetric flow rate CVF(t) are available for the analysis period in the future. In this case, predicted or expected values of the consumption volumetric flow rate can be used. These can be based, for example, on measured values from a representative period in the past, but they can also be based purely on estimated or calculated values.

In a preferred embodiment, a difference between the maximum delivery volumetric flow rate MDVF(t) and the current consumption volumetric flow rate CVF(t) is formed for the analysis of the compressed-air supply security during the analysis period at a large number of, in particular successive, points in time $t_0, \ldots, t_i, \ldots$ and taken into account in the analysis. The difference can be formed by using the formula DVFE(t)=MDVF(t)−CVF(t).

In a particularly preferred further development of the method according to the invention, a delivery volumetric flow rate surplus DVFE(t) is integrated over one or more specific time periods to analyze the security of compressed-air supply, wherein DVFE(t)=MDVF(t)−CVF(t).

In another advantageous embodiment of the method according to the invention, the effective buffer volume V or the maximum reserve $R_{MAX}$ that can be stored in the effective buffer volume V is also taken into account in the analysis of compressed-air supply security. As a simplification of the effective buffer volume, the decidedly provided or existing storage volume can also be used as an approximate value. The effective buffer volume can be taken into account in particular by integrating the delivery volumetric flow rate surplus DVFE(t) over time, taking into account the maximum storage capacity of the effective buffer volume V defined by the difference between the pressure margin limit UPL and the required pressure LPL. The result is the time course of the reserve R(t). The reserve R(t) is the compressed-air stored in the effective buffer volume V at time t. The reserve R(t) is coupled to the network pressure p(t). The higher the network pressure p(t), the greater the reserve R(t), wherein the reserve R(t) is limited upwards by the pressure margin limit UPL. If the network pressure p(t) is at the required pressure LPL, reserve R is exhausted. If the network pressure p(t) falls below the required pressure LPL, the value of the reserve R(t) becomes negative. In practice this means that the compressed-air demand of the compressed-air consumers can no longer be covered at any time in the analyzed time interval. In contrast to the delivery volumetric flow rate surplus DVFE, the reserve is not a volumetric flow rate but an integral of a volumetric flow rate over time, i.e. a volume.

In an advantageous embodiment, the calculation is carried out in such a way that the maximum delivery volumetric flow rate MDVF(t) of the compressed-air generator and the quantity of compressed air stored in the effective buffer volume V are taken into account to cover the compressed-air requirement.

It is assumed that the consumption volumetric flow rate CVF(t) is primarily covered by the delivery volumetric flow rate DVFE of the compressed-air generator and only secondarily by air stored in the effective buffer volume V (reserve R). The following effect is to be achieved:

If the delivery volumetric flow rate surplus DVFE is positive at a time t, the delivery volumetric flow rate surplus DVFE is used to store air in the effective buffer volume V. The amount of compressed-air stored in the effective buffer volume V increases if the effective buffer volume V is not yet filled with maximum compressed air (i.e. the reserve R(t) has not yet reached the maximum value $R_{MAX}$). Otherwise, the compressed-air quantity stored in the effective buffer volume V remains at the maximum permissible value ($R_{MAX}$).

If the delivery volumetric flow rate surplus DVFE is negative at a time t, the delivery volumetric flow rate surplus DVFE, which in this case could be called the deficit delivery volumetric flow rate, is taken from the effective buffer volume V. The amount of compressed air stored in the effective buffer volume V decreases, if any compressed air is stored in the effective buffer volume V at all.

If at a time t the delivery volumetric flow rate surplus DVFE is 0 m³/min, the compressed-air requirement is completely covered by the maximum delivery volumetric flow rate MDVF(t) of the compressed-air generator. The amount of compressed air stored in the effective buffer volume V remains unchanged.

In a concrete embodiment of the method according to the invention, the calculation of the reserve R could be carried out as follows:

$$\frac{dR(t)}{dt} = \begin{cases} DVFE(t), & \text{if } (R(t) < RMAX) \text{ or } DVFE(t) < 0 \\ 0, & \text{otherwise} \end{cases}$$

Wherein:
R(t): Compressed air stored as reserve R in the effective buffer volume V at time t.
$R_{MAX}$: The maximum reserve limited by the pressure margin limit and the required pressure, which can be stored in the effective buffer volume.
DVFE(t): The delivery volumetric flow rate surplus at time t.
To calculate the reserve R, a starting value must be entered for the start of the analysis period (t=0). This can be, for example, the value $R_{MAX}$ (maximum reserve).
The maximum reserve $R_{MAX}$ is determined as follows.

$$R_{MAX} = \frac{UPL - LPL}{AP} * V$$

Wherein:
$R_{MAX}$: The maximum reserve limited by the pressure margin limit UPL, which can be stored in the effective buffer volume.
UPL: The pressure margin limit (maximum permissible network pressure as overpressure).
LPL: Required pressure (minimum required network pressure as overpressure).
AP: Ambient pressure (as absolute pressure).
V: Effective buffer volume.
A qualitative statement on the overload of the compressed-air system is now made as to whether compressed air must and can be taken from the effective buffer volume V to cover the compressed-air requirement.

If at no time compressed air from the effective buffer volume is required, since the maximum delivery volumetric flow rate MDVF(t) of the compressed-air generator exceeds the consumption volumetric flow rate CVF(t) at any time, the station is certainly not overloaded.

If the consumption volumetric flow rate CVF(t) temporarily exceeds the maximum delivery volumetric flow rate MDVF(t) of the compressed-air generator, but the quantity of compressed air stored in the effective buffer volume V is completely sufficient to compensate the difference, the compressed-air system is not overloaded, since the effective buffer volume V is dimensioned to a sufficiently large extent.

If the consumption volumetric flow rate CVF(t) temporarily (but not permanently) exceeds the maximum delivery volumetric flow rate MDVF(t) of the compressed-air generator and if the quantity of compressed air stored in the effective buffer volume V is not sufficient to completely cover the difference, the compressed-air system is temporarily overloaded because the effective buffer volume V is not dimensioned to a sufficiently large extent and/or the maximum delivery volumetric flow rate MDVF(t) is too small.

If the consumption volumetric flow rate CVF(t) permanently exceeds the maximum delivery volumetric flow rate MDVF(t) of the compressed-air generator, the compressed-air system is permanently overloaded. The permanent overload is only due to a too low maximum delivery volumetric flow rate MDVF of the compressed-air generator.

A quantitative statement about the overload of the compressed-air system is obtained by checking what quantity of compressed air must be taken from the effective buffer volume V to cover the compressed-air requirement.

It was explained above that different levels of overload estimation are given, from "certainly not overloaded" to "not overloaded" to "temporarily overloaded" to "permanently overloaded". In a very broad definition one can already speak of an overload of the compressed-air system if compressed air must be taken from the effective buffer volume V in order to avoid pressure underrun. A narrower definition of "overload", which will also be assumed in the following, indicates that a compressed-air system is only overloaded when pressure underruns are unavoidable. Such an analysis of whether the compressed-air system is overloaded can be carried out as follows, for example:

First, an analysis of the course of the reserve R(t) is carried out. Whenever the maximum delivery volumetric flow rate MDVF(t) exceeds the value of the consumption volumetric flow rate CVF(t) at the corresponding time, the difference between the maximum delivery volumetric flow rate and consumption volumetric flow rate is used to store compressed air in the effective buffer volume V, provided that the effective buffer volume is not yet filled to a maximum. The effective buffer volume is filled to the maximum if the network pressure p(t) has reached, but does not exceed, the pressure margin limit UPL. If the effective buffer volume is filled to a maximum, the reserve is $R_{MAX}$.

If the maximum delivery volumetric flow rate MDVF(t) falls below the consumption volumetric flow rate CVF(t), the difference between the maximum delivery volumetric flow rate and consumption volumetric flow rate is compensated by compressed air from the effective buffer volume V, provided that compressed air is still stored in the effective buffer volume V. If just enough compressed air is stored in the effective buffer volume V that the network pressure p(t) assumes the value of the required pressure LPL but does not fall below it, the reserve is 0 m³ (zero reserve). If the network pressure p(t) falls below the required pressure LPL, the reserve R(t) becomes negative and is thus exhausted.

If the network pressure p(t) is between the required pressure LPL and the pressure margin limit UPL, the reserve R(t) should assume a value between 0 m³ (zero reserve) and $R_{MAX}$.

In a simple variant, for the calculation of the reserve R(t), the network pressure p(t) can be set in a linear relationship to the required pressure LPL and the pressure margin limit UPL.

$$R(t) = \frac{p(t) - LPL}{UPL - LPL} * R_{max}$$

The use of a linear correlation and the linking of the value of $R_{MAX}$ with the pressure margin limit UPL and the value of 0 m³ with the required pressure LPL shall only be understood as an example. The limits of 0 m³ (zero reserve) and $R_{MAX}$ can of course be set differently and instead of a linear correlation any other (non-linear) correlations are conceivable.

The concrete quantitative statement results from the fact that the minimum value of the reserve for the observation period and the scenario examined is determined and set in relation to the maximum reserve $R_{MAX}$, wherein the ratio is referred to in the following as the degree of reserve.

$$RG = \frac{\text{MIN}(R(t))}{R_{MAX}}$$

Wherein:
RG: The degree of reserve of the compressed-air system in the respective scenario.
$R_{MAX}$: The maximum reserve limited by the pressure margin limit UPL, which can be stored in the effective buffer volume V.
MIN(R (t)): The minimum time value of the reserve for the respective scenario.
If the degree of reserve RG is 100%, the compressed-air system is certainly not overloaded.
If the degree of reserve RG is between 0% and 100%, the compressed-air system is not overloaded if the compressed-air generators produce so much compressed air that the effective buffer volume V is always sufficiently filled when the consumption volumetric flow rate CVF (t) exceeds the maximum delivery volumetric flow rate MDVF(t) and compressed air from the effective buffer volume V is required to cover the consumption volumetric flow rate CVF(t). The closer the degree of reserve is to 0%, the more compressed air must be stored in the effective buffer volume V to prevent it from falling below the required pressure LPL.
If the degree of reserve is at or below 0%, the compressed-air system is overloaded. It is impossible to store sufficient compressed air in the effective buffer volume V to prevent it from falling below the required pressure LPL.

The result of the analysis (qualitative and/or quantitative) is communicated to the operator of the compressed-air system, e.g.

by a report, which can contain both positive and negative results and is sent to the operator irrespective of the result;

by a warning message which is only sent to the operator if the result is positive, i.e. a possible overload of the compressed-air system has been detected.

In the event of an avoidable overload, the operator could then increase the required pressure used in the compound control system in order to be able to maintain the actual required pressure LPL by building up a minimum reserve. The quantitative analysis provides an indication of the amount by which one needs to increase the required pressure used in the control system.

In the event of an unavoidable temporary overload, for example, the method determines the following measures:
  either increase the maximum delivery volumetric flow rate MDVF(t) by replacing and/or supplementing compressed-air generators in the compressed-air system
  or increase the effective buffer volume V in the compressed-air system
  or both In the event of an unavoidable permanent overload, the operator could then increase the delivery volumetric flow rate MDVF(t) in the worst case by replacing and/or supplementing compressed-air generators.

In addition, the operator of the compressed-air system may also have the option of changing the course of the consumption volumetric flow rate CVF(t) so that peaks in the consumption volumetric flow rate CVF(t) are avoided by shifting the consumption components over time and thus an overload is avoided even without and/or with minor changes in the compressed-air system.

When analyzing the security of compressed-air supply, the reserve R(t) stored in the effective buffer volume V can also be taken into account in a preferred embodiment.

The result of the analysis of compressed-air supply security can also be used in a possible embodiment for maintenance scheduling, wherein maintenance scheduling can also be initiated manually or automatically. The analysis of compressed air supply security proposed according to the invention over a certain period of time can also be used to prospectively check in which period of time the time course of the maximum delivery volumetric flow rate as well as the time course of the consumption volumetric flow rate, by optionally taking into account the effective buffer volume, guarantee sufficient compressed-air supply security, even if certain components of the compressed-air system, such as a compressed-air generator, have to be taken out of operation for maintenance purposes. Preferably, the maintenance schedule also takes into account the expected duration of the maintenance measure and suggests, for example, appropriate time windows during which upcoming maintenance can be carried out without endangering the security of compressed-air supply.

Another possible and optionally additional possibility for application of the results of the analysis of compressed-air supply security is to automatically integrate the results of this analysis in a control procedure of the compressed-air system that controls the operation of the compressed-air system. This makes it possible, for example, to dispense with building up a specific reserve by increasing the network pressure p(t) if the assumed consumption volumetric flow rate can easily be produced by the available compressed-air generators within the prospective period of time of the control or regulation. This could be assumed, for example, if the consumption volumetric flow rate predicted recently and/or currently over a certain period and/or for the near future is far below the maximum delivery volumetric flow rate MDVF(t). With a corresponding increase in the consumption volumetric flow rate CVF(t), the system control could also—after carrying out the method according to the invention—determine to build up a reserve in the effective buffer volume. Depending on the result of the analysis, it is also conceivable that the reserve could be filled up to $R_{MAX}$ or not to the maximum value $R_{MAX}$.

For energy efficiency reasons, it seems sensible to dispense with building up a reserve or to keep a reserve low, as the build-up of the reserve leads to an increased network pressure p(t), which in turn leads to an increased electrical power consumption of the compressed-air generators. If, on the other hand, the system control recognizes that in the recent and/or near future the course of the consumption volumetric flow rate CVF(t)—which can be estimated particularly for the future on the basis of models—is close to the maximum delivery volumetric flow rate MDVF(t), the system control can build up a reserve R(t) as a precautionary measure in order to be able to temporarily provide compressed air from the effective buffer volume when the consumption volumetric flow rate CVF(t) continues to increase and thereby reduce or even avoid the risk of falling below the required pressure LPL.

The method according to the invention for analyzing the compressed-air supply security of a compressed-air system can, for example, also be integrated into a control method of a compressed-air system, as described in EP 09799353. Of course, it can also be combined with a plurality of other alternative control methods.

Alternatively or additionally it is also possible that the result of the analysis of the compressed-air supply security is used to check whether the compressed-air system may have to be extended or retrofitted. In general, the result of the analysis of compressed-air supply security can be used even before a current compressed-air system is constructed, for example, taking into account models of the compressed-air system from which a consumption volumetric flow rate can also be derived over time CVF(t) as well as on the basis of a maximum delivery volumetric flow rate MDVF(t), taking into account different scenarios when designing and/or planning a compressed-air system. Thus, the present method also represents a planning instrument for the design or planning of a compressed-air system or also for the extension or adaptation of an existing compressed-air system.

The method for analyzing the security of compressed-air supply can be carried out wholly or in part by a control device designed to control the compressed-air system. Although the method according to the invention can basically be used for planning a compressed-air system, monitoring a compressed-air system or controlling a compressed-air system, it may make sense in the latter two cases, namely for monitoring the compressed-air system or controlling the compressed-air system, to let the control system carry out the process completely or partially.

In a preferred embodiment of the method according to the invention, one or more simulation models $M_1$, $M_2$ . . . of compressed-air systems and/or components of compressed-air systems can be used to estimate or calculate a maximum delivery volumetric flow rate MDVF(t). With regard to the design and consideration of simulation models $M_1$, $M_2$ . . . of compressed-air systems, reference is also made to EP 14712233 and EP 14710264, whose disclosed content with regard to a possible design of models $M_1$, $M_2$ . . . of compressed-air systems is hereby referred to.

In a possible embodiment it is conceivable to use artificial intelligence methods from a certain pattern of the course of the consumption volumetric flow rate CVF(t), by optionally taking into account certain additional information such as calendar day, time, etc., to draw conclusions on an assumed consumption volumetric flow rate CVF(t) in the future. In a further preferred embodiment, scenarios $S_{1(t)}$, $S_{2(t)}$ can be used in the method according to the invention for analyzing compressed-air supply security, which in particular describe the failure of one or more compressed-air generators, and/or a prospective extension of a future consumption of compressed-air, for example by connecting additional consumers to the compressed-air network, and/or the occurrence of compressed-air consumption peaks at certain times or over certain periods of time in a given course of time.

Especially the inclusion of defined, especially time-dependent scenarios further develops the proposed method for the analysis of compressed-air supply security in an advantageous way. The security of compressed-air supply can thus be checked with regard to various conceivable scenarios and evaluated in quantitative or qualitative terms.

These scenarios can of course also be defined or coded via the time course of the maximum delivery volumetric flow rate MDVF(t) and/or the time course of the consumption volumetric flow rate CVF(t). In this case, the scenario would already be described implicitly in the respective progressions.

In another preferred embodiment of the method according to the invention, reaction times of the compressed-air generators are taken into account in the analysis of compressed-air supply security. The main issue here is the switch-on times of the compressed-air generators. The switch-on time here is the period of time from the requirement to supply compressed air to the compressed-air generator until the actual supply of compressed air from the compressed-air generator. The time required to start a stationary compressed-air generator is particularly important here.

In a possible preferred embodiment, a maintenance schedule planning routine is proposed, which automatically carries out a maintenance schedule based on the analysis of compressed-air supply security in such a way that a threat to compressed-air supply security is avoided. In particular, the maintenance schedule planning routine checks whether maintenance of the compressed-air system, which may involve the decommissioning of one or more components, in particular one or more compressed-air generators, can take place within a certain period without endangering the security of compressed-air supply.

In a preferred further embodiment, the maintenance schedule planning routine takes into account the time required for maintenance $\Delta T_W$ (presumed duration of the maintenance measure), i.e. it is checked whether the compressed-air supply security is also guaranteed over the entire period $\Delta T_W$ in the event of a possible maintenance date at a certain future point in time.

In a further preferred embodiment, measures are determined/issued in the present method according to the invention as a result of the analysis of the compressed-air supply security, which reduce and/or eliminate the endangerment of the compressed-air supply security. Such measures could be medium-long term measures, for example the indication that the compressed-air system should be extended with regard to the compressed-air generators and/or short-term measures, for example proposals on how the system control should be influenced or an immediate automatic effect on the system control. It can be provided in a preferred embodiment, for example, that measures may be taken to increase the delivery volumetric flow rate DVF(t) and to thus increase the pressure in the compressed-air network or feed additional quantity of compressed air into the buffer volume, in particular automatically, if the security of compressed-air supply is at risk. The delivery volumetric flow rate DVF(t) is the actual delivery volumetric flow rate of the compressed-air generator at the respective time t—in contrast to the maximum delivery volumetric flow rate MDVF(t).

Finally, it is conceivable that as a result of the analysis of the compressed-air supply security, a degree of reserve and/or a reserve of the compressed-air system will be determined and/or displayed, in particular as a report and/or on a display. The operator of a plant is thus informed at all times about the status of compressed-air supply security. The display can be qualitative or quantitative. For example, a degree of reserve could be specified as a percentage.

Finally, the present application proposes a method for controlling a compressed-air system, wherein the method for controlling the compressed-air system simultaneously including a method for analyzing the compressed-air supply security, in particular in accordance with one of claims 1 to 19, wherein the compressed-air system comprises one or more compressed-air generators and one or more compressed-air consumers are supplied via a compressed-air network. It is provided that a time course of the maximum delivery volumetric flow rate MDVF(t) is recorded, estimated or calculated, that a time course of the consumption volumetric flow rate CVF(t) is recorded, estimated or calculated, and that the time course of the maximum delivery volumetric flow rate MDVF(t) and the time course of the consumption volumetric flow rate CVF(t) are automatically offset against each other over an analysis period to analyze the security of compressed-air supply, wherein the controller of the compressed-air system increases the delivery volumetric flow rate DVF(t) if the compressed-air supply security is endangered and thus conveys an additional quantity of compressed air into the effective buffer volume V to increase a reserve while increasing the network pressure p(t) of the compressed-air network (9).

BRIEF DESCRIPTION OF THE DRAWINGS

The invention is also explained below with regard to further features and advantages on the basis of the description of exemplary embodiments and with reference to the drawings below, wherein.

DETAILED DESCRIPTION OF THE INVENTION

Figure 11:
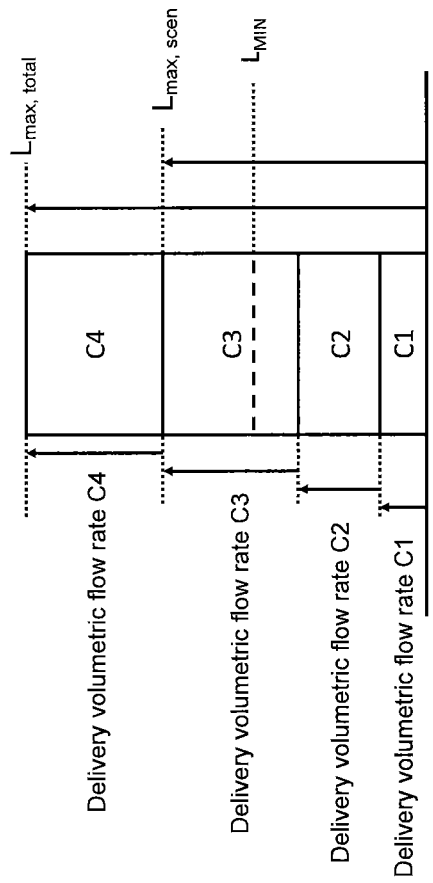
FIG. 11 shows an illustration of the procedure for designing a compressed-air system according to the state of the art.

FIG. 11 illustrates the procedure for designing a compressed-air system according to the state of the art for a scenario in which the largest compressed-air generator, in relation to the delivery volumetric flow rate, fails. In FIG. 11 three levels are marked for different delivery volumetric flow rates, namely $L_{MIN}$, $L_{MAX,\ scen}$ and $L_{MAX,\ total}$. $L_{MAX,\ total}$ refers to the maximum delivery volumetric flow rate that all compressors $C_1$ to $C_4$ can produce together. In static terms, the scenario is now assumed that the compressor $C_4$ with the highest delivery volumetric flow rate fails. Thus, $S_{MAX,\ scen}$ designates the maximum delivery volumetric flow rate for the scenario that compressor $C_4$ fails and only the compressors $C_1$ to $C_3$ generate compressed-air.

Finally, $L_{MIN}$ is the minimum volumetric flow rate that must be available in the event of failure of the largest compressor $C_4$.

The state of the art approach is a purely static one. Time sequences, in particular of the consumption volumetric flow rate, but also of the maximum delivery volumetric flow rate, are irrelevant.

First (by measurement or estimation) the maximum value of the consumption volumetric flow rate is determined. This is interpreted as the minimum delivery volumetric flow rate that the compressed-air system must be able to provide even if the selected scenario occurs. In FIG. 11, the design is based on a scenario (in which the compressed-air generator) with the largest delivery volume—in FIG. 11 the compressed-air generator $C_4$, fails. Accordingly, it is not the maximum delivery volumetric flow rate of all compressed-air generators ($C_1$ to $C_4$) contained in the compressed-air system that is relevant for oversizing, but the maximum delivery volumetric flow rate when selecting the compressed-air generator $C_4$, i.e. the sum of the delivery volumetric flow rates of the compressed-air generators $C_1$ to $C_3$. The maximum delivery volumetric flow rate in the event of failure of the compressed-air generator $C_4$ must be above the minimum volumetric flow rate. Only then is it ensured in accordance with the state of the art that the consumption volumetric flow rate can also be covered when the scenario occurs.

Figure 1:
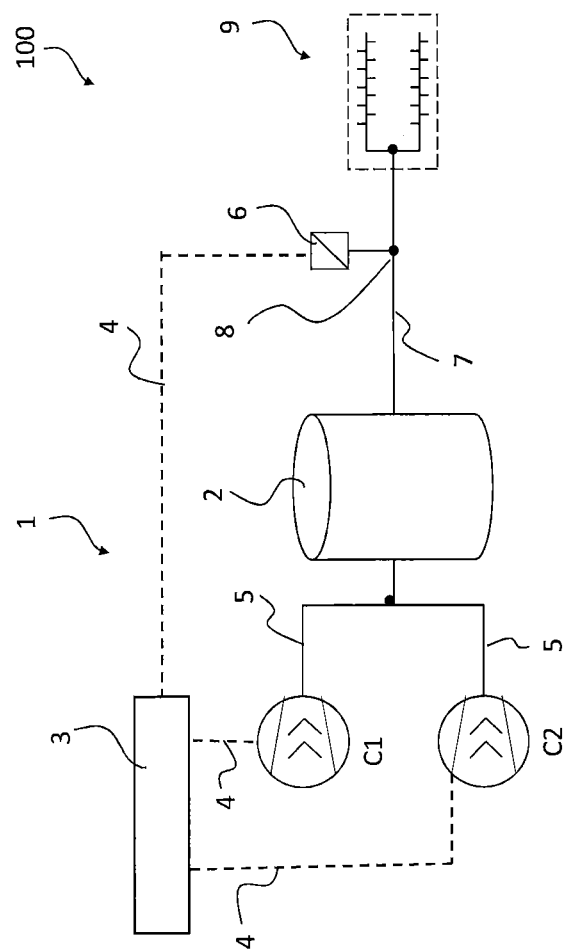
FIG. 1 shows a schematic, typical structure of a compressed-air system, which is used as the basis for the following description of the different runtime behaviors of a compressed-air system.

FIG. 1 shows a simplified structure of a compressed-air system, on the basis of which an embodiment of the method according to the invention is to be explained below. In this example, the compressed-air system initially comprises two compressed-air generators $C_1$, $C_2$, which draw in air from the environment, compress it and convey it via lines 5 into a compressed-air reservoir 2. It should already be noted at this point that compressed-air systems typically comprise more than two compressed-air generators, often 4 to 20 compressed-air generators.

The compressed-air reservoir 2 does not necessarily have to be a dedicated storage tank, but can also be formed by the functional interaction of many storage volumes (dedicated storage tanks, pipeline volumes, . . . ). A compressed-air network 9 transports the compressed air to a large number of compressed-air consumers.

The compressed-air consumers draw compressed air from the compressed-air reservoir 2 via lines 7 and via the compressed-air network 9. Compressed-air consumers usually require not only a certain volumetric flow rate of compressed air, but the compressed air must also be provided at a certain pressure level. A system control 3 ensures that the pressure level is maintained. A transfer point 8 is defined where the compressed air from the compressed-air generation and compressed-air treatment equipment is transferred to the compressed-air network. At transfer point 8, the actual value of the network pressure p(t) can be recorded via a pressure sensor 6. The system control 3 controls the compressed-air generators $C_1$, $C_2$ via control lines 4 in such a way that the specified pressure limits between a required pressure LPL and a pressure margin limit UPL are maintained. The compressed-air system illustrated in FIG. 1 is used as a reference below. For use as a reference, unless otherwise stated, it should be assumed that the compressors $C_1$, $C_2$ provide a delivery volumetric flow rate of 5 m³/min each in the operating state of load operation, the effective buffer volume is 2.5 m³, the required pressure LPL is 7 bar, and the pressure margin limit UPL is 8 bar.

Figure 2:
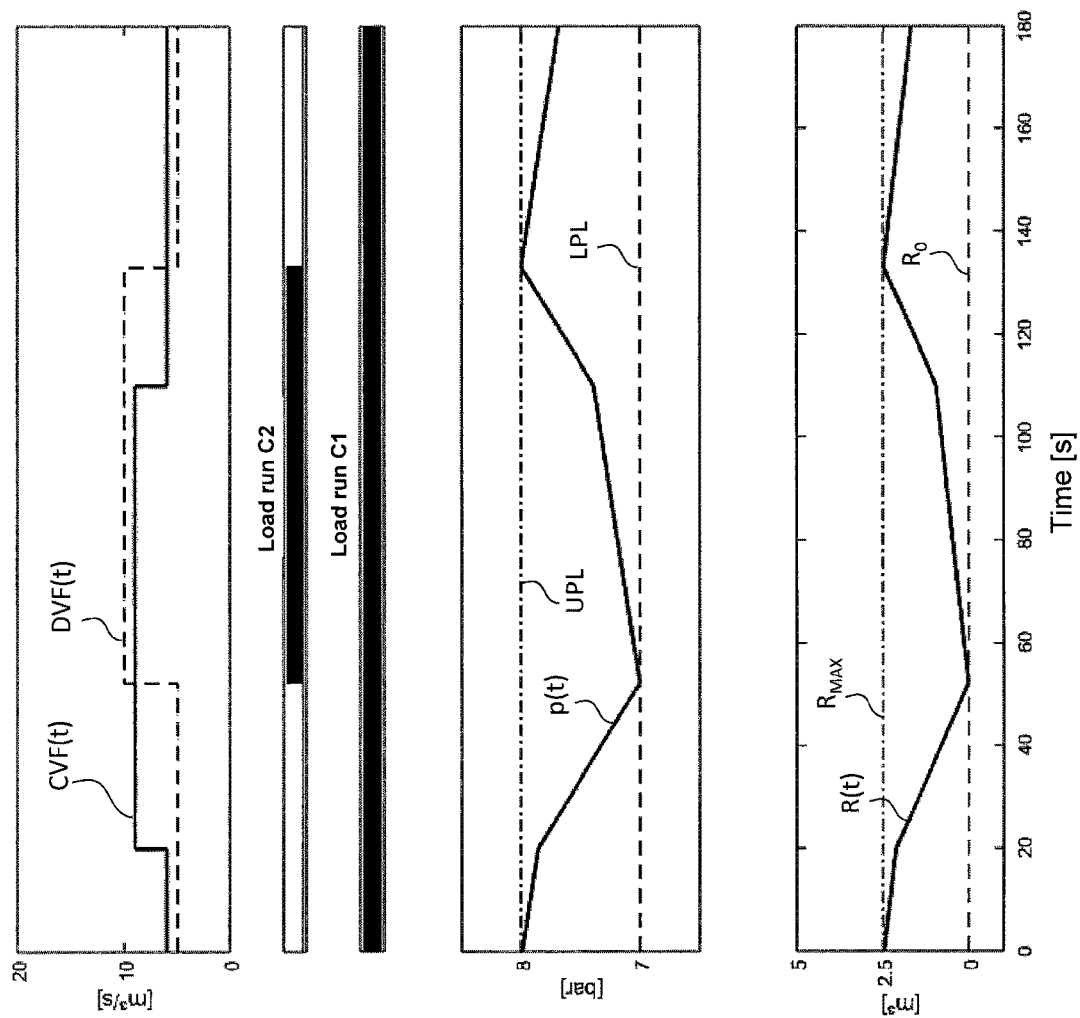
FIG. 2 shows the runtime behavior of the compressed-air system according to FIG. 1.

FIG. 2 shows the runtime behavior of the compressed-air system 1 controlled by the system control 3. Due to the course of the consumption volumetric flow rate CVF(t), the compressors $C_1$ and $C_2$ are controlled in such a way that the network pressure p(t) always moves within the range specified by the required pressure LPL and the pressure margin limit UPL. This is possible here, since the compressed-air system is sufficiently dimensioned for the course of the consumption volumetric flow rate CVF(t). The result is a fluctuating reserve R(t) coupled to the network pressure p(t), which moves between the zero reserve $R_0$ and the maximum reserve $R_{MAX}$. The reserve R(t) reaches the value of the zero reserve $R_0$ when the network pressure p(t) assumes the value of the required pressure LPL. The reserve R(t) reaches the value of the maximum reserve $R_{MAX}$ when the network pressure p(t) assumes the value of the pressure margin limit UPL.

Figure 3:
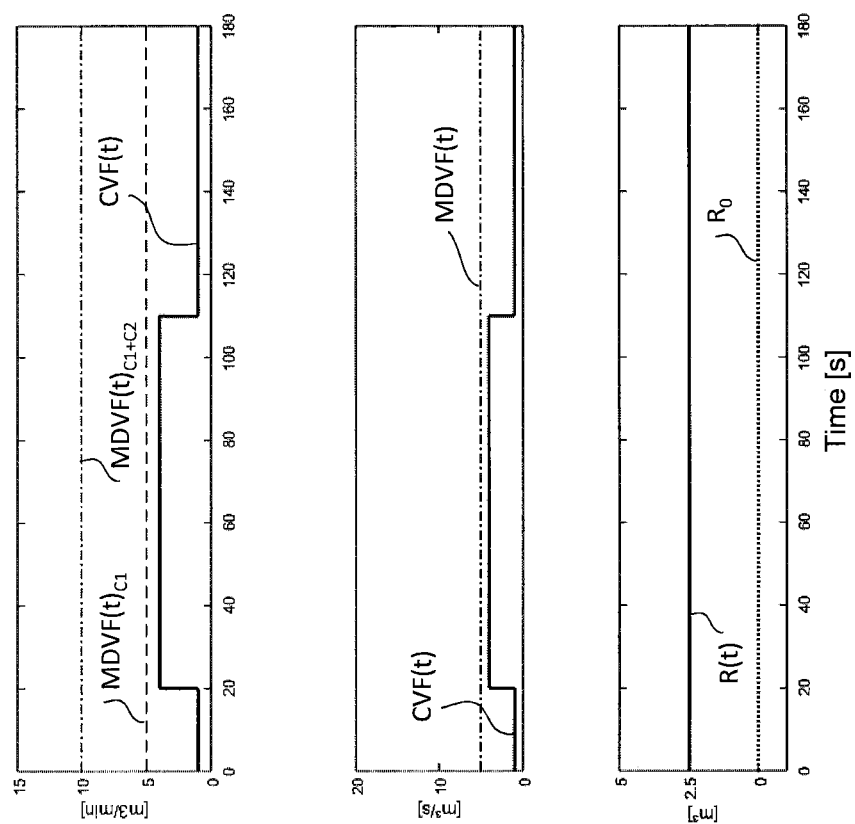
FIG. 3 to FIG. 6 show the (calculated) behavior of the compressed-air system according to FIG. 1 within the analysis, with different assumptions for the consumption volumetric flow rate CVF(t) and simultaneously assumed failure of the compressed-air generator $C_1$.

FIG. 3 shows by way of example the application of the method according to the invention for the compressed-air system from FIG. 1 under the assumption that the compressed-air generator $C_1$ is not available for the period under consideration. It applies principally to the compressed-air system that the maximum delivery volumetric flow rate of the compressed-air generator $C_1$ on the one hand and the compressed-air generator $C_2$ on the other hand are available at 10 m³/min in the present example. However, as it is assumed that the compressed-air generator $C_1$ is not available, the maximum delivery volumetric flow rate of the compressed-air generator $C_1$ (here 5 m³/min) is omitted and the maximum possible delivery volumetric flow rate MDVF is reduced to 5 m³/min. For the analysis of compressed-air supply security, a variation of the consumption volumetric flow rate CVF(t) is assumed which alternates between two levels, namely 1 m³/min and 4 m³/min. Since in this example the course of the consumption volumetric flow rate CVF(t) is always below the maximum possible delivery volumetric flow rate MDVF of t, reserve R is never required to cover the consumption volumetric flow rate CVF(t). The value of the reserve R(t) is therefore always on the path of the maximum reserve $R_{MAX}$ (here 2.5 m³). At no time does the reserve R(t) decrease from the value of the maximum reserve $R_{MAX}$ or even approach the zero reserve R0 (0 m³).

A qualitative analysis of the compressed-air supply security of the compressed-air system shows that with certainty there is no overload, since the value of the reserve R(t) is always at the value of the maximum reserve $R_{MAX}$. A quantitative analysis of the compressed-air supply security shows that the minimum value of the reserve R(t) is 2.5 m³ and thus the degree of reserve is 100%.

Figure 4:
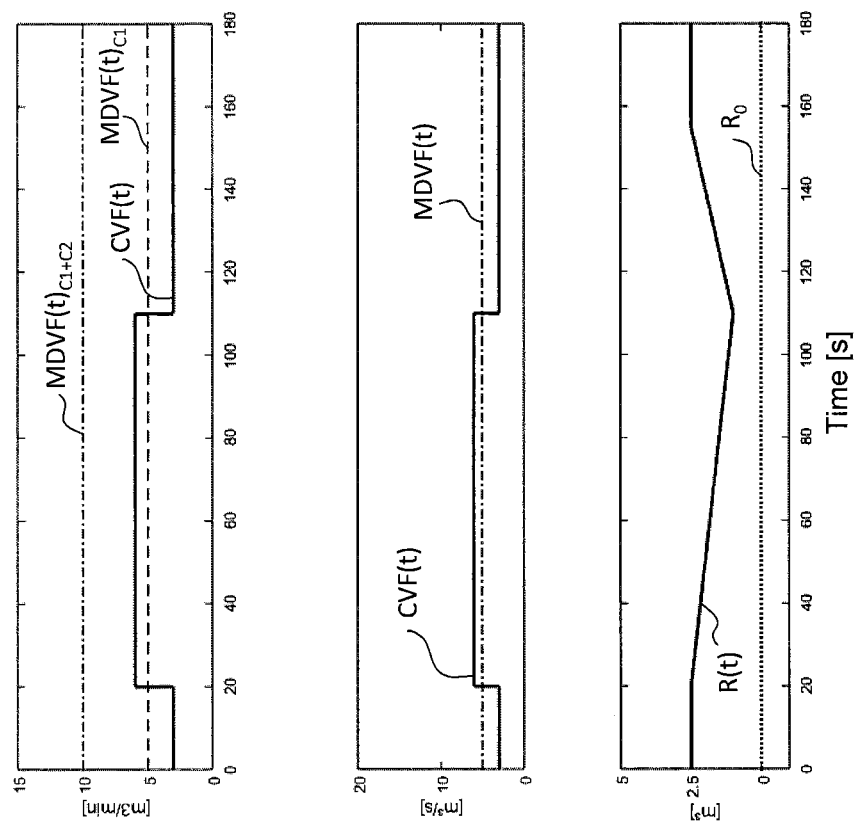

FIG. 4 shows the application of the method according to the invention for the compressed-air system from FIG. 1 with the same assumptions as in FIG. 3 with the difference that the course of the consumption volumetric flow rate CVF(t) has constantly increased by 2 m³/min and the two levels of the course of the consumption volumetric flow rate CVF(t) are now at 3 m³/min and 6 m³/min. The course of the consumption volumetric flow rate CVF(t) now temporarily exceeds the maximum delivery volumetric flow rate MDVF (t). Accordingly, reserve R(t) is temporarily required to cover consumption, as can be seen from the course of the consumption volumetric flow rate CVF(t). The reserve R(t) is no longer consistently at the value of the maximum reserve $R_{MAX}$, but is temporarily reduced. However, the reserve R(t) does not reach or fall below the zero reserve $R_0$ at any time, but rises again to the value of the maximum reserve $R_{MAX}$ after reduction of the consumption volumetric flow rate CVF(t).

A qualitative analysis of the compressed-air supply security shows that there is no overload, since the reserve R(t) does not fall below the value of the zero reserve $R_0$. A quantitative analysis of the compressed-air supply security shows that the minimum value of the reserve R(t) is 1 m³ and the degree of reserve is 40% (1 m³/2.5 m³).

Figure 5:
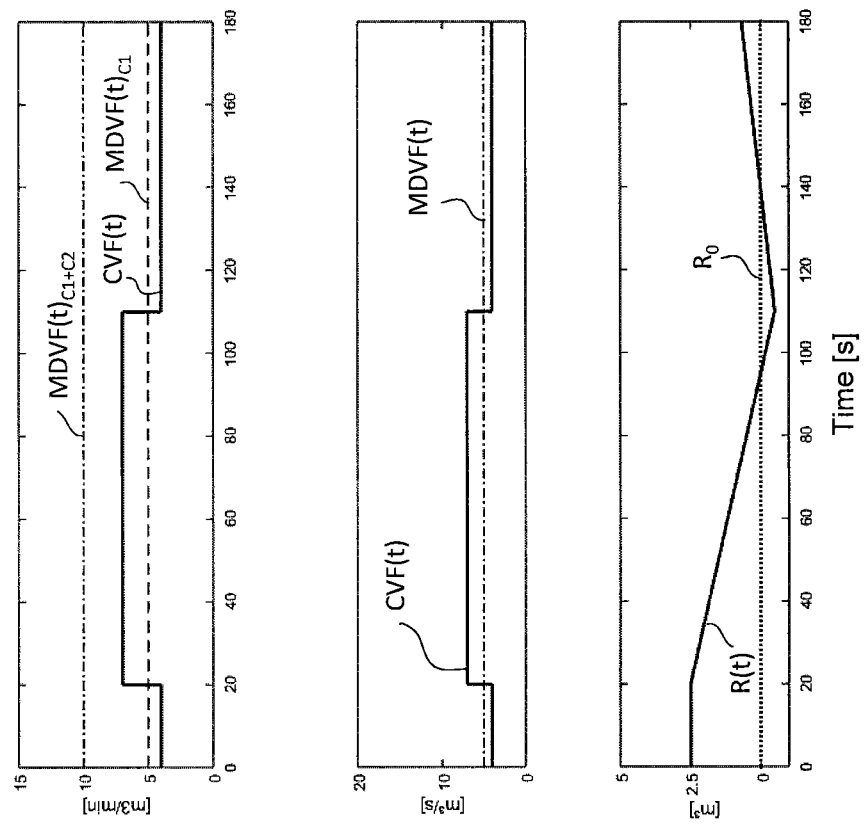

FIG. 5 shows the application of the method according to the invention for the compressed-air system from FIG. 1 with the same assumptions as in FIG. 3 and FIG. 4 with the difference, however, that the course of the consumption volumetric flow rate CVF(t) has increased constantly and 1 m³/min compared to the situation in FIG. 4 and the two levels of the consumption volumetric flow rate CVF(t) are now at 4 m³/min and 7 m³/min. As the course of the consumption volumetric flow rate CVF(t) shows, the consumption volumetric flow rate CVF(t) now exceeds the maximum delivery volumetric flow rate MDVF(t) even more significantly at times. Accordingly, reserve R is still required temporarily to cover the consumption volumetric flow rate CVF(t). The reserve R(t) now temporarily but not permanently falls below the zero reserve $R_0$, i.e. the specified required pressure LPL can no longer be maintained at times.

A qualitative analysis of the compressed-air supply security shows that there is a temporary overload, since the reserve falls below the zero reserve $R_0$ temporarily but not permanently. A quantitative analysis of compressed-air supply security shows that the minimum value of the reserve is −0.5 m³ and the degree of reserve is thus −20%.

Figure 6:
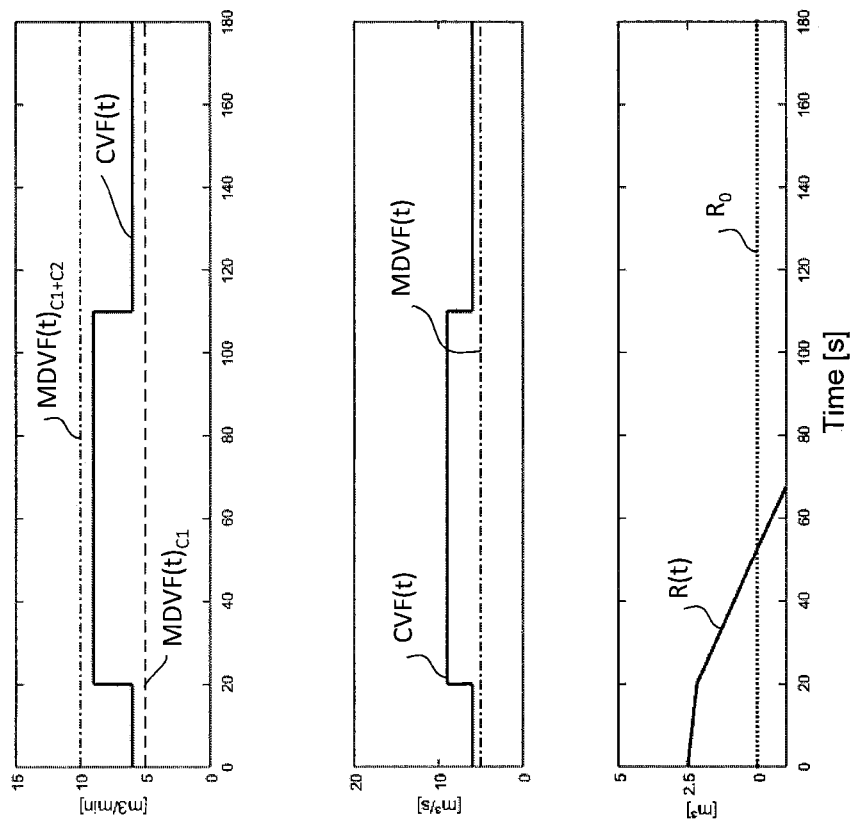

FIG. 6 shows the application of the method according to the invention for the compressed-air system from FIG. 1 with the same assumptions as in FIG. 3, FIG. 4 and FIG. 5, with the difference, however, that the consumption volumetric flow rate CVF(t) has constantly increased by 2 m³/min compared to the situation in FIG. 5, so that the two levels of the consumption volumetric flow rate CVF(t) are now at 6 m³/min and 9 m³/min. The consumption volumetric flow rate CVF(t) now always exceeds the maximum delivery volumetric flow rate MDVF(t). Accordingly, reserve R is permanently required to cover the consumption volumetric flow rate CVF(t). The reserve R(t) is now permanently below the zero reserve $R_0$. The maximum delivery volumetric flow rate MDVF(t) can no longer cover the consumption reflected in the consumption volumetric flow rate CVF(t).

A qualitative analysis of the compressed-air supply security shows that there is a permanent overload, since the reserve R(t) is permanently below the value of the zero reserve $R_0$. A quantitative analysis of the compressed-air supply security shows that the minimum value of the reserve R(t) is −∞ m³ and the degree of reserve is thus −∞.

Figure 7:
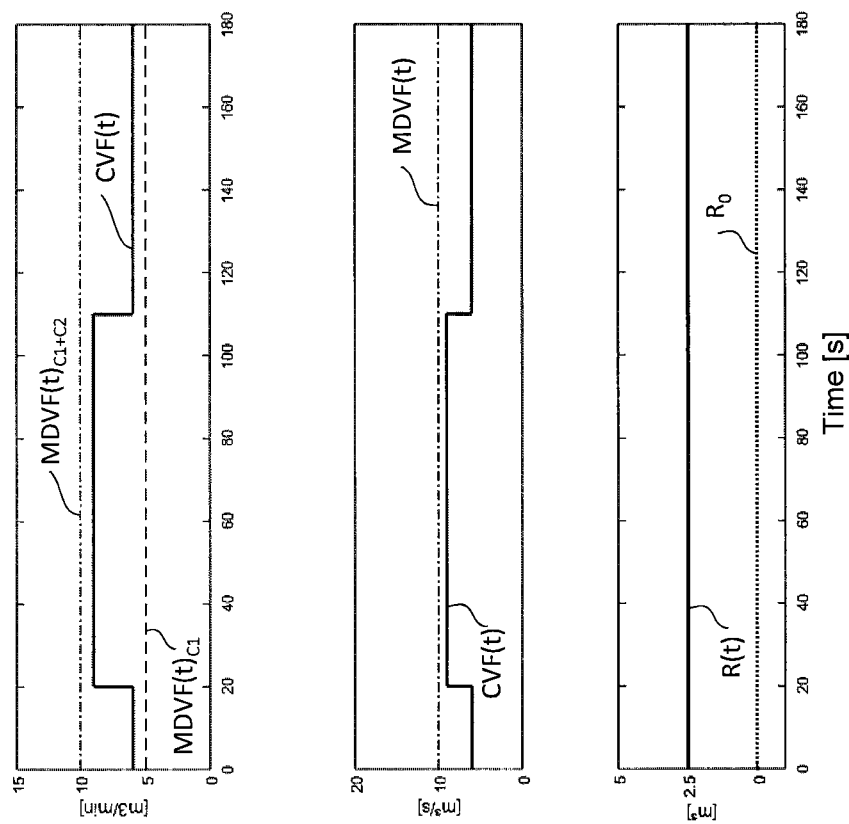
FIG. 7 to FIG. 10 show the (calculated) behavior of the compressed-air system according to FIG. 1, wherein here both compressed-air generators provide the maximum delivery volumetric flow rate and again different assumptions are made for the consumption volumetric flow rate CVF(t).

FIG. 7 shows the application of the method according to the invention for the compressed-air system from FIG. 1, assuming that, in contrast to the scenarios in FIGS. 3 to 6, compressed-air generator $C_1$ is also available in addition to compressed-air generator $C_2$. The maximum delivery volumetric flow rate of $C_1$ and $C_2$ is thus 10 m³/min. For the analysis of the compressed-air supply security, the consumption volumetric flow rate CVF(t) is assumed to change between two levels between 6 m³/min and 9 m³/min (as already assumed by FIG. 6). Since the course of the consumption volumetric flow rate CVF(t) is always below the maximum delivery volumetric flow rate MDVF(t), the reserve R(t) is not required at any time to cover the course of the consumption volumetric flow rate CVF(t). The value of the reserve therefore always remains at the value of the maximum reserve $R_{MAX}$ (here 2.5 m³). At no time will the reserve R(t) be reduced from this value of the maximum reserve $R_{MAX}$.

A qualitative analysis of the compressed-air supply security shows that there is no overload with certainty, since the reserve R(t) is always at the value of the maximum reserve $R_{MAX}$. A quantitative analysis of the compressed-air supply security shows that the minimum value of the reserve R(t) is 2.5 m³ and thus the degree of reserve is 100%.

Figure 8:
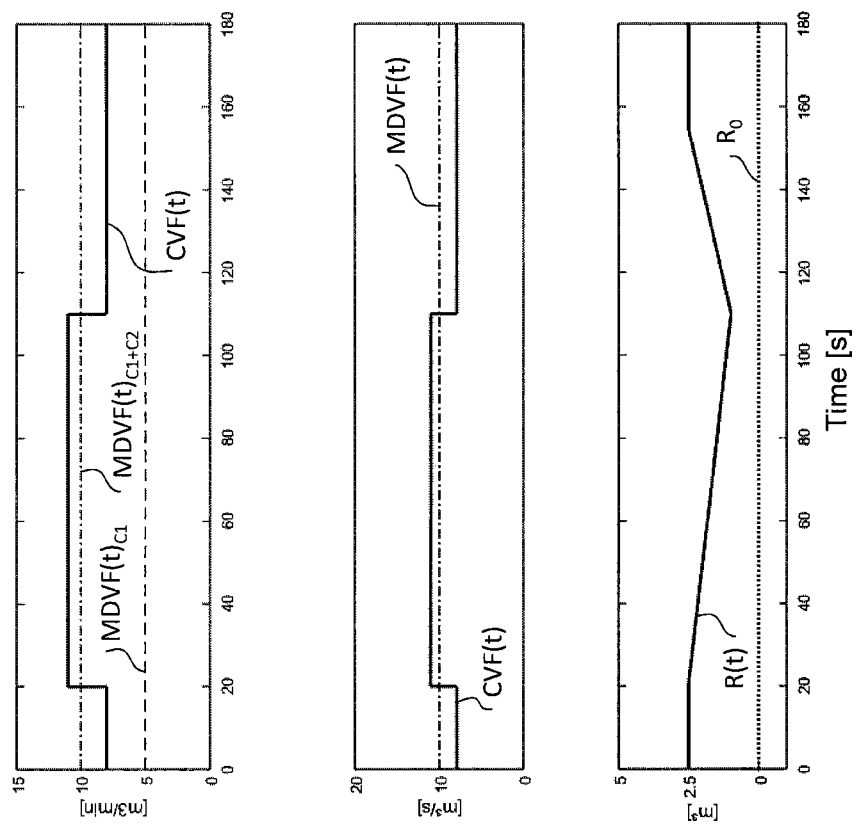

FIG. 8 shows the application of the method according to the invention for the compressed-air system from FIG. 1 with the same assumptions as in FIG. 7, with the difference, however, that the course of the consumption volumetric flow rate CVF(t) has constantly increased by 2 m³/min and the two levels of the consumption volumetric flow rate CVF(t) are now at 8 m³/min and 11 m³/min. The consumption volumetric flow rate CVF(t) now temporarily exceeds the maximum delivery volumetric flow rate MDVF(t). Accordingly, reserve R(t) is temporarily required to cover the consumption volumetric flow rate CVF(t). The reserve R(t) is no longer consistently at the value of the maximum reserve $R_{MAX}$, but is temporarily reduced starting from the value of the maximum reserve $R_{MAX}$. However, the reserve R(t) does not reach or fall below the zero reserve $R_0$. A qualitative analysis of the compressed-air supply security shows that there is no overload, since the reserve does not fall below the value of the zero reserve $R_0$. A quantitative analysis of the compressed-air supply security shows that the minimum value of the reserve R(t) is 1 m³ and the degree of reserve is 40% (1 m³/2.5 m³).

Figure 9:
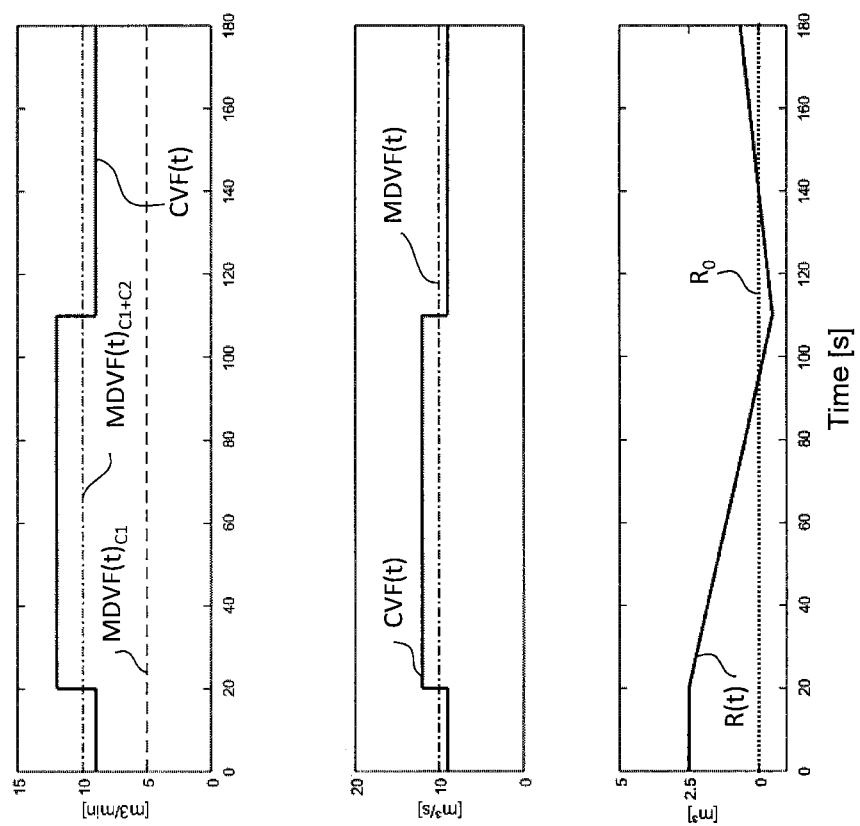

In FIG. 9 shows the application of the method according to the invention for the compressed-air system from FIG. 1 with the same assumptions as in FIG. 7 and FIG. 8, with the difference that the consumption volumetric flow rate CVF(t) has constantly increased by 1 m³/min compared to the situation in FIG. 8 and the two levels of the consumption volumetric flow rate CVF(t) are now at 9 m³/min and 12 m³/min. The consumption volumetric flow rate CVF(t) now exceeds the maximum delivery volumetric flow rate MDVF (t) considerably at times. Accordingly, reserve R(t) is still temporarily required to cover the consumption volumetric flow rate CVF(t). The reserve R(t) is now temporarily but not permanently below the zero reserve $R_0$, i.e. the specified required pressure LPL cannot be maintained during this period.

A qualitative analysis of the compressed-air supply security shows that there is a temporary overload, since the reserve R(t) is temporarily but not permanently below the value of the zero reserve $R_0$. A quantitative analysis of the compressed-air supply security shows that the minimum value of the reserve R(t) is −0.5 m³ and the degree of reserve is thus −20%.

Figure 10:
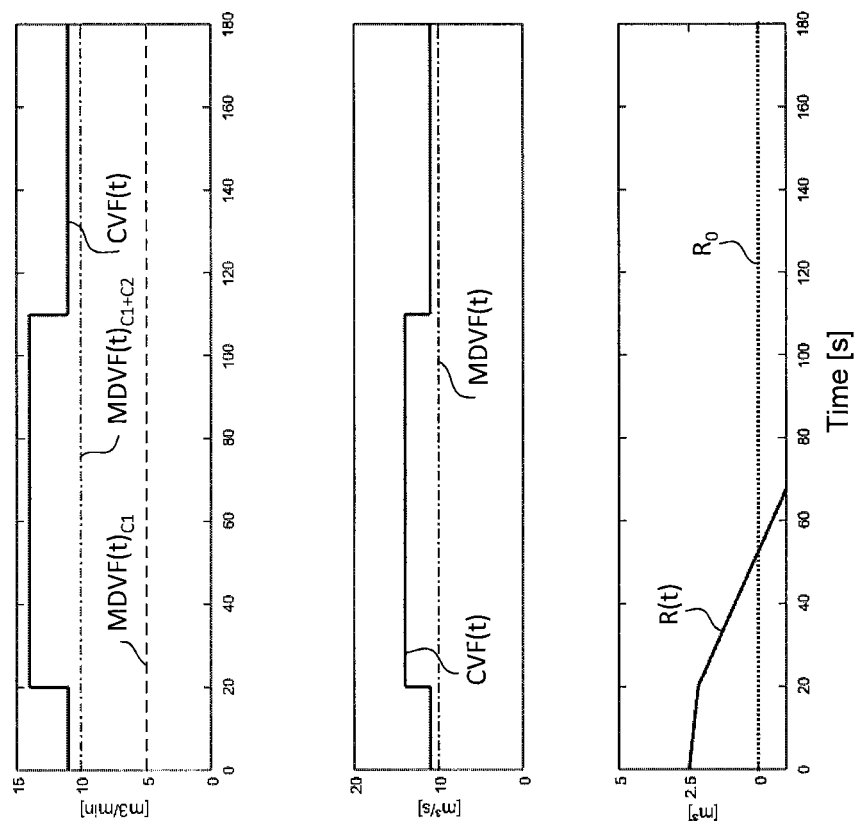

FIG. 10 shows the application of the method according to the invention for the compressed-air system from FIG. 1 with the same assumptions as in FIG. 7, FIG. 8 and FIG. 9, with the difference that the consumption volumetric flow rate CVF(t) has constantly increased by 2 m³/min compared to the situation in FIG. 9 and the two levels of the consumption volumetric flow rate CVF(t) are now at 11 m³/min and 14 m³/min. The consumption volumetric flow rate CVF(t) now always exceeds the maximum possible delivery volumetric flow rate MDVF(t). Accordingly, the reserve of R(t) is permanently required to cover the consumption volumetric flow rate CVF(t). The reserve R(t) is now permanently below the zero reserve $R_0$.

A qualitative analysis of the compressed-air supply security shows that there is a permanent overload, since the reserve R(t) is permanently below the value of the zero reserve $R_0$. A quantitative analysis of the compressed-air supply security shows that the minimum value of the reserve R(t) is −∞ m³ and the degree of reserve is −∞.

The exemplary embodiments according to FIG. 3 to FIG. 11 each show a constant course of the maximum delivery volumetric flow rate MDVF(t). This is only to be understood as an example. Like the consumption volumetric flow rate CVF(t), the maximum delivery volumetric flow rate MDFV(t) can fluctuate in time, e.g. if a compressed-air generator fails in a planned manner during the analysis period $\Delta T_W$.

Figure 12:
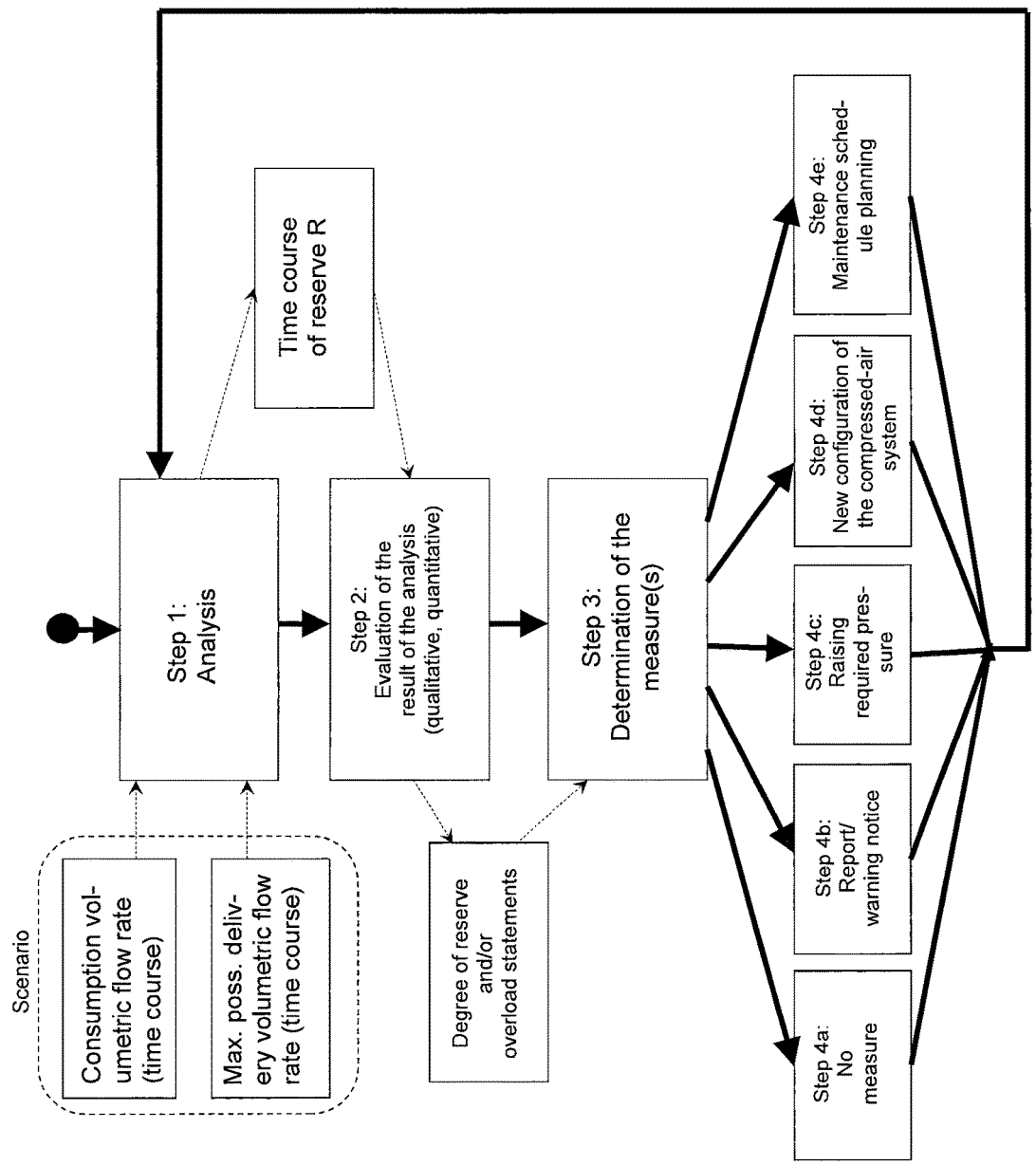
FIG. 12 shows a flow chart for an exemplary embodiment of the method according to the invention.

FIG. 12 illustrates the method according to the invention in a flowchart. The method can be initiated cyclically, event-driven and/or one-off. One reason for starting the method for analyzing the compressed-air supply security according to the present exemplary embodiment could, for example, be to check whether maintenance is possible within a certain period of time or which periods might be suitable for maintenance. In addition, it could be checked cyclically or periodically whether a new design of the compressed-air system appears necessary to achieve a certain degree of compressed-air supply security. Furthermore, it could be monitored cyclically—for example by the system control—whether there is sufficient compressed-air supply security and a corresponding report of a qualitative or quantitative evaluation could be output, for example on a display. Finally, as part of the plant control during operation, the method could run continuously in order to determine to what extent control measures are necessary or at least useful in order to improve compressed-air supply security, for example to increase the required pressure or to further fill the reserve.

First, the method for analyzing the security of compressed-air supply is based on a specific scenario. A possible scenario could be, for example, that a compressed-air generator fails with a certain delivery volumetric flow rate. In this scenario, certain time sequences result for the consumption volumetric flow rate or certain time sequences for a maximum delivery volumetric flow rate. In step 1, an analysis is performed by temporal offsetting the maximum delivery volumetric flow rate MDVF(t) and the time course of the consumption volumetric flow rate CVF(t), wherein the effective buffer volume V is preferably also taken into account in this analysis. In step 2, the analysis result is evaluated either qualitatively and/or quantitatively. The evaluation is carried out by making a qualitative and/or quantitative statement about the degree of reserve or an overload statement.

In step 3, a decision is made on the measures to be initiated, which are carried out in step 4. Measures that can be performed in step 4 include
no action
report/warning message and/or
increase in required pressure,
new design of the compressed-air system
maintenance scheduling

LIST OF REFERENCE NUMERALS

AP Ambient pressure
$\Delta T_w$ Duration of the maintenance measure
C1, C2 Compressors
CVF(t) Consumption volumetric flow rate
DVFE(t) Delivery volumetric flow rate surplus
LPL Specified required pressure
MDVF(t) Maximum delivery flow rate
$R_{MAX}$ Maximum reserve
UPL Pressure margin limit
V Buffer volume
2 Compressed-air reservoir
3 System control
4 Control lines
5, 7 Lines
6 Pressure sensor
8 Transfer point
9 Compressed-air network

The invention claimed is:

1. Method for analyzing the compressed-air supply security of a compressed-air system which comprises one or more compressed-air generators and supplies one or more compressed-air consumers via a compressed-air network, wherein
    a time course of the maximum delivery volumetric flow rate MDVF(t) is recorded, estimated or calculated,
    a time course of the consumption volumetric flow rate CVF(t) is recorded, estimated or calculated,
    the time course of the maximum delivery volumetric flow rate MDVF(t) and the time course of the consumption volumetric flow rate CVF(t) are automatically offset against each other over an analysis period in order to analyze the compressed-air supply security,
    and the result of the analysis of the compressed-air supply security is used to ensure compressed-air supply security from the compressed-air system to the compressed-air consumers.

2. Method according to claim 1, wherein the analysis period additionally or exclusively comprises a period in the past, so that a temporal offset of the maximum delivery volumetric flow rate MDVF(t) and of the time course of the consumption volumetric flow rate CVF(t) occurs partially or completely by taking the past into account.

3. Method according to claim 1, wherein the analysis period additionally or exclusively comprises a period in the future, so that a temporal offset of the maximum delivery volumetric flow rate MDVF(t) and of the time course of the consumption volumetric flow rate CVF(t) occurs partially or completely by taking the future into account.

4. Method according to claim 1, wherein for analysis of the compressed-air supply security during the analysis period a differential formation of maximum delivery volumetric flow rate MDVF(t) and consumption volumetric flow rate CVF(t) is carried out at a plurality of, in particular successive, times $t_0, \ldots, t_i, \ldots$ and taken into account in the analysis.

5. Method according to claim 1, wherein for analysis of the compressed-air supply security a delivery volumetric flow rate surplus DVFE(t) is integrated over one or more specific time periods, wherein DVFE(t)=MDVF(t)−CVF(t).

6. Method according to claim 1, wherein in the analysis of the compressed-air supply security the effective buffer volume V or the maximum reserve $R_{MAX}$ which can be stored in the effective buffer volume V is taken into account.

7. Method according to claim 6, wherein the maximum reserve $RMA_x$ results as follows in the case of a predeterminable pressure margin limit UPL and a predeterminable required pressure LPL:

$$R_{MAX} = \frac{UPL - LPL}{AP} * V$$

wherein V is the effective buffer volume and AP is the ambient pressure.

8. Method according to claim 1, wherein in the analysis of the compressed-air supply security the reserve R(t) stored in the effective buffer volume V is taken into account.

9. Method according to claim 1, wherein the result of the analysis of compressed-air supply security is used for maintenance scheduling.

10. Method according to claim 9, wherein measures are taken, in particular automatically, to increase the delivery volumetric flow rate DVF(t) if the compressed-air supply security is endangered and thus the pressure in the compressed-air network is increased or additional quantity of compressed air is fed into the buffer volume.

11. Method according to claim 1, wherein the result of the analysis of the compressed-air supply security is automatically incorporated into a control method of the compressed-air system which controls the operation of the compressed-air system.

12. Method according to claim 1, wherein the result of the analysis of the compressed-air supply security is used for planning purposes for:
designing a compressed-air system, or
extending or adapting an existing compressed-air system.

13. Method according to claim 1, wherein the method for analyzing the compressed-air supply security is performed completely or partially by a control device which is provided for controlling the compressed-air system.

14. Method according to claim 1, wherein one or more simulation models $M_1$, $M_2$, . . . of compressed-air systems and/or components of compressed-air systems are used in the method for analyzing the compressed-air supply security, in particular for estimating or calculating a maximum delivery volumetric flow rate MDVF(t).

15. Method according to claim 1, wherein in the method for analyzing the compressed-air supply security, scenarios $S_1(t)$, $S_2(t)$, . . . are taken into account, which in particular describe
the failure of one or more compressed-air generators, and/or
a prospective extension of a future consumption of compressed-air, for example by connecting additional consumers to the compressed-air network (9), and/or
the occurrence of compressed-air consumption peaks at certain times or over certain periods of time
in a predetermined time course.

16. Method according to claim 1, wherein in the analysis of the compressed-air supply security reaction times of the compressed-air generators, in particular switch-on times, are taken into account.

17. Method according to claim 1, wherein in a maintenance schedule planning routine, based on the analysis of the compressed-air supply security, a maintenance schedule is automatically determined in which a threat to the compressed-air supply security is avoided and wherein it is checked in particular in the maintenance schedule planning routine whether a maintenance of the compressed-air system can take place within a certain time period without endangering the compressed-air supply security.

18. Method according to claim 17, wherein the time period $\Delta T_W$ (duration of the maintenance measure) required for maintenance is also taken into account in the maintenance scheduling routine.

19. Method according to claim 1, wherein measures are determined/issued as a result of the analysis of the compressed-air supply security which reduce and/or eliminate the endangerment of the compressed-air supply security.

20. Method according to claim 1, wherein as a result of the analysis of the compressed-air supply security a degree of reserve and/or a reserve of the compressed-air system are determined and/or displayed, in particular output as a report and/or shown on a display.

21. Method for controlling a compressed-air system, wherein the method for controlling the compressed-air system simultaneously includes a method for analyzing the compressed-air supply security of the compressed-air system, wherein the compressed-air system comprises one or more compressed-air generators and supplies one or more compressed-air consumers via a compressed-air network, wherein
a time course of the maximum delivery volumetric flow rate MDVF(t) is recorded, estimated or calculated,
a time course of the consumption volumetric flow rate CVF(t) is recorded, estimated or calculated,
and the time course of the maximum delivery volumetric flow rate MDVF(t) and the time course of the consumption volumetric flow rate CVF(t) are automatically offset against each other over an analysis period in order to analyze the compressed-air supply security,
wherein the control of the compressed-air system increases the delivery volumetric flow rate DVF(t) if the compressed-air supply security is endangered and thus conveys an additional quantity of compressed air while increasing the network pressure p(t) into the effective buffer volume to increase a reserve.

22. Method for analyzing the compressed-air supply security of a compressed-air system which comprises one or more compressed-air generators and supplies one or more compressed-air consumers via a compressed-air network, wherein
a time course of the maximum delivery volumetric flow rate MDVF(t) is recorded, estimated or calculated,
a time course of the consumption volumetric flow rate CVF(t) is recorded, estimated or calculated,
and the time course of the maximum delivery volumetric flow rate MDVF(t) and the time course of the consumption volumetric flow rate CVF(t) are automatically offset against each other over an analysis period in order to analyze the compressed-air supply security,
wherein the result of the analysis of compressed-air supply security is used for maintenance scheduling.

23. Method for analyzing the compressed-air supply security of a compressed-air system which comprises one or more compressed-air generators and supplies one or more compressed-air consumers via a compressed-air network, wherein a time course of the maximum delivery volumetric flow rate MDVF(t) is recorded, estimated or calculated, a time course of the consumption volumetric flow rate CVF(t) is recorded, estimated or calculated, and the time course of the maximum delivery volumetric flow rate MDVF(t) and the time course of the consumption volumetric flow rate CVF(t) are automatically offset against each other over an analysis period in order to analyze the compressed-air supply security, wherein the result of the analysis of the compressed-air supply security is automatically incorporated into a control method of the compressed-air system which controls the operation of the compressed-air system.

24. Method for analyzing the compressed-air supply security of a compressed-air system which comprises one or more compressed-air generators and supplies one or more compressed-air consumers via a compressed-air network, wherein a time course of the maximum delivery volumetric flow rate MDVF(t) is recorded, estimated or calculated, a time course of the consumption volumetric flow rate CVF(t) is recorded, estimated or calculated, and the time course of the maximum delivery volumetric flow rate MDVF(t) and the time course of the consumption volumetric flow rate CVF(t) are automatically offset against each other over an analysis period in order to analyze the compressed-air supply security, wherein the result of the analysis of the compressed-air supply security is used for planning purposes for:

designing a compressed-air system, or extending or adapting an existing compressed-air system.

25. Method for analyzing the compressed-air supply security of a compressed-air system which comprises one or more compressed-air generators and supplies one or more compressed-air consumers via a compressed-air network, wherein a time course of the maximum delivery volumetric flow rate MDVF(t) is recorded, estimated or calculated, a time course of the consumption volumetric flow rate CVF(t) is recorded, estimated or calculated, and the time course of the maximum delivery volumetric flow rate MDVF(t) and the time course of the consumption volumetric flow rate CVF(t) are automatically offset against each other over an analysis period in order to analyze the compressed-air supply security, wherein measures are determined/issued as a result of the analysis of the compressed-air supply security which reduce and/or eliminate the endangerment of the compressed-air supply security.

26. Method for analyzing the compressed-air supply security of a compressed-air system which comprises one or more compressed-air generators and supplies one or more compressed-air consumers via a compressed-air network, wherein a time course of the maximum delivery volumetric flow rate MDVF(t) is recorded, estimated or calculated, a time course of the consumption volumetric flow rate CVF(t) is recorded, estimated or calculated, and the time course of the maximum delivery volumetric flow rate MDVF(t) and the time course of the consumption volumetric flow rate CVF(t) are automatically offset against each other over an analysis period in order to analyze the compressed-air supply security, wherein as a result of the analysis of the compressed-air supply security a degree of reserve and/or a reserve of the compressed-air system are determined and/or displayed, in particular output as a report and/or shown on a display.

\* \* \* \* \*

UNITED STATES PATENT AND TRADEMARK OFFICE
CERTIFICATE OF CORRECTION

| | |
|---|---|
| PATENT NO. | : 11,274,992 B2 |
| APPLICATION NO. | : 16/094348 |
| DATED | : March 15, 2022 |
| INVENTOR(S) | : Foerster et al. |

It is certified that error appears in the above-identified patent and that said Letters Patent is hereby corrected as shown below:

On the Title Page

Item (30) Foreign Application Priority Data: Please correct "16166507" to read -- 16166507.0 --

Signed and Sealed this
Nineteenth Day of July, 2022

Katherine Kelly Vidal
*Director of the United States Patent and Trademark Office*